United States Patent [19]

Getreuer

[11] Patent Number: 4,807,214
[45] Date of Patent: Feb. 21, 1989

[54] APPARATUS FOR RECORDING AND/OR READING INFORMATION ON AN OPTICAL RECORD CARRIER PROVIDED WITH PREFORMED TRACKS

[75] Inventor: Kurt W. Getreuer, Eindhoven, Netherlands

[73] Assignee: U.S. Philips Corporation, New York, N.Y.

[21] Appl. No.: 314,149

[22] Filed: Oct. 23, 1981

[30] Foreign Application Priority Data

Jun. 29, 1981 [NL] Netherlands ............ 8103117

[51] Int. Cl.⁴ .............. G11B 7/095; G11B 7/007
[52] U.S. Cl. ........................... 369/46; 369/44; 369/275
[58] Field of Search .............. 365/215, 234; 369/32-33, 41, 44-50, 59, 275, 283-285

[56] References Cited

U.S. PATENT DOCUMENTS

| | | | |
|---|---|---|---|
| 4,142,209 | 2/1979 | Hedlund et al. | 365/234 X |
| 4,238,843 | 12/1980 | Carasso et al. | 365/234 |
| 4,326,282 | 4/1982 | Verbloom et al. | 369/48 |
| 4,366,564 | 12/1982 | de Haan et al. | 369/48 |
| 4,375,088 | 2/1983 | de Haan et al. | 365/234 |

Primary Examiner—Raymond F. Cardillo
Assistant Examiner—Steven R. Garland
Attorney, Agent, or Firm—Algy Tamoshunas

[57] ABSTRACT

An apparatus for recording and/or reproducing information in and/or from an optically inscribable and readable disk-shaped record carrier with a pre-formed tracks with a track modulation constituted by a radial wobble, in order to obtain a tracking signal. A reference signal for deriving the tracking signal by synchronous detection is obtained by rectifying the difference signal which is the difference between the signals supplied by the two photo-detectors disposed on opposite sides of a line which extends in the track direction, by subsequently extracting the component of twice the frequency via a phase-locked loop and by frequency-dividing the signal, so that phase shifts of 180° in the difference signal do not affect the synchronous detection.

5 Claims, 4 Drawing Sheets

APPARATUS FOR RECORDING AND/OR READING INFORMATION ON AN OPTICAL RECORD CARRIER PROVIDED WITH PREFORMED TRACKS

The invention relates to an apparatus for inscribing and/or reading a record carrier, which record carrier comprises a disk-shaped substrate with a radiation-sensitive information layer and is provided with information areas arranged in accordance with a spiral or concentric track pattern. The record carrier is intended for recording and/or reproducing digitally coded information of a fixed bit frequency in the information areas via a radiation beam. The information areas have an optically detectable first periodic track modulation, the track position being modulated in a radial direction, for generating a radial tracking signal during recording and/or reproduction, said modulations being radially in phase. The apparatus, for this purpose, comprises an optical system for projecting a light beam onto said information areas, a detector for detecting the radiation which is reflected or transmitted by the recording areas, which detector is divided into two halves along a line corresponding to the track direction, and a read circuit for extracting a read-information signal from the detected radiation.

Such an apparatus is described in the Netherlands Patent Application No. 8,000,121 corresponding to U.S. application Ser. No. 134,392 filed Mar. 26, 1980, now abandoned and No. 8,000,122, corresponding to U.S. Pat. No. 4,375,088 which propose the use of a second periodic track modulation in order to obtain a clock signal. In order to obtain a radial tracking signal said Applications propose the use of filters and phase-locked loops for obtaining the clock signal and a signal of a frequency corresponding to the period of the first periodic track modulation, which last-mentioned signal is derived from the difference between the signals originating from the detector parts disposed on both sides of a dividing line which extends in the track direction and the use of these two signals for deriving a tracking signal by synchronous detection. It has been found that the method proposed in said previous Application functions satisfactorily only when the tracking is correct and fails to do so during a change of track. In accordance with an insight underlying the invention this is because said difference signal, contains components which are caused by said first periodic track modulation and which exhibit two oppositely directed phase jumps of substantially 180° during a track change, so that said components are not suitable for generating a reference signal for synchronous detection by means of a phase-locked loop.

It is an object of the invention to provide an apparatus of the type mentioned in the opening paragraph, which is characterized in that the apparatus comprises means for determining the difference between the radiation detected by two halves of the detector, means for extracting a signal having a frequency corresponding to the period of the periodic track modulation, means for generating an even higher harmonic of said extracted signal, means for the synchronous detection, by means of a reference signal, of a signal obtained from the detector in order to generate a radial tracking signal, and means for generating said reference signal in synchronism with said even higher harmonic.

The steps in accordance with the invention ensure that 180° phase shifts do not affect the reference-signal generation, because said phase shifts do not occur in even higher harmonics.

The invention will now be described in more detail with reference to the drawing, in which FIGS. 1a–1c by way of illustration shows a record carrier which may be used in an apparatus in accordance with the invention.

FIGS. 2a–2f, sectional view of such a record carrier in the longitudinal direction of the tracks in a number of stages during the manufacture of such a record carrier.

Figure 1A:
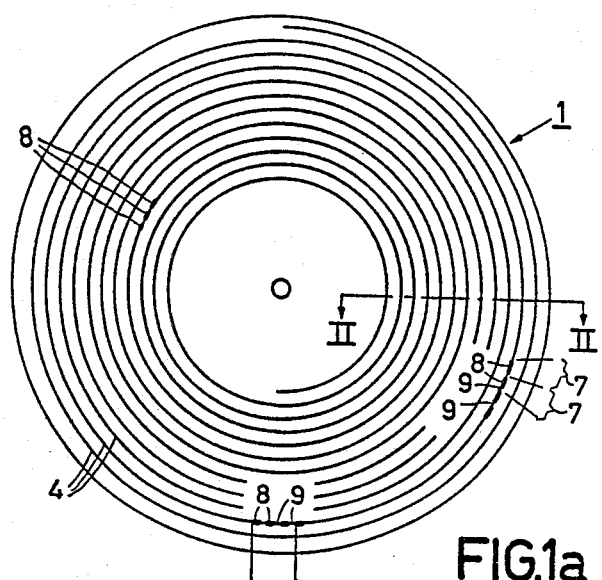
Figure 1B:
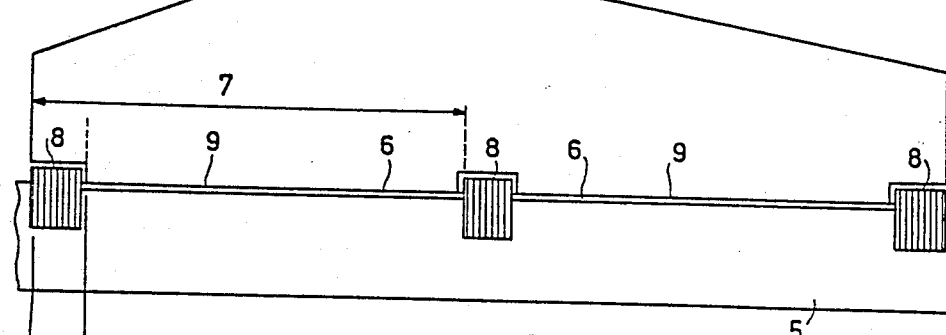
Figure 1C:
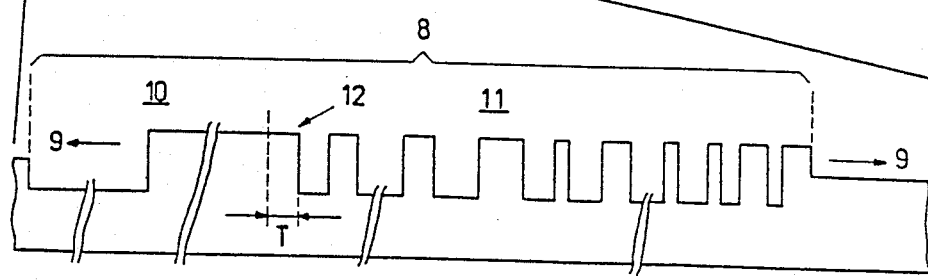

FIGS. 1a–1c by way of illustration shows a version of a record carrier as described in the said previous Patent Applications, to which the principle in accordance with the invention may be applied, FIG. 1a being a plan view of said record carrier, FIG. 1b showing a part of a track 4 of said record carrier on an enlarged scale, and FIG. 1c showing a synchronization area of said part on an enlarged scale. The record carrier body 1 is provided with a spiral track 4. Said track is divided into a multitude of sectors 7, for example 128 per turn. Each sector 7 comprises an information area 9, which is intended for recording digitally coded information, and a synchronization area 8. Such a synchronization area 8 comprises two portions, namely an indicator portion 10 and an address portion 11. All the information required for controlling the recording process is contained in the address portion 11.

In order to ensure that the digital information is recorded in an accurately defined path, the track 4 functions as servo-track. The servo tracks 4, specifically in the information areas 9, are therefore formed as grooves in the substrate 5, which makes it possible to control a radiation beam, which is directed at the record carrier for recording digital information, so that it accurately coincides with said servo-track 4, in other words to control the position of the radiation beam in a radial direction via a servo system employing the light reflected by the record carrier.

For the recording of digital information the record carrier body is provided with a layer of material 6 which, if exposed to suitable radiation, is subject to an optical change, so that when an information track thus inscribed is scanned by a read beam the reflected beam is amplitude-modulated in accordance with the recorded information.

As is apparent from the foregoing, the record carriers which are supplied to the user and whose information areas consequently do not yet contain information, have a groove structure in said information areas within the sectors. Moreover, within each sector such a record carrier has a synchronization area 8 in the form of an optically detectable relief structure. FIG. 1b shows a part of a track 4 on an enlarge scale, illustrating the sequence of a number of information areas 9 and synchronization areas 8. The synchronization areas 8 comprise a relief structure constituted by a sequence of recesses alternating with intermediate areas.

Figure 2:
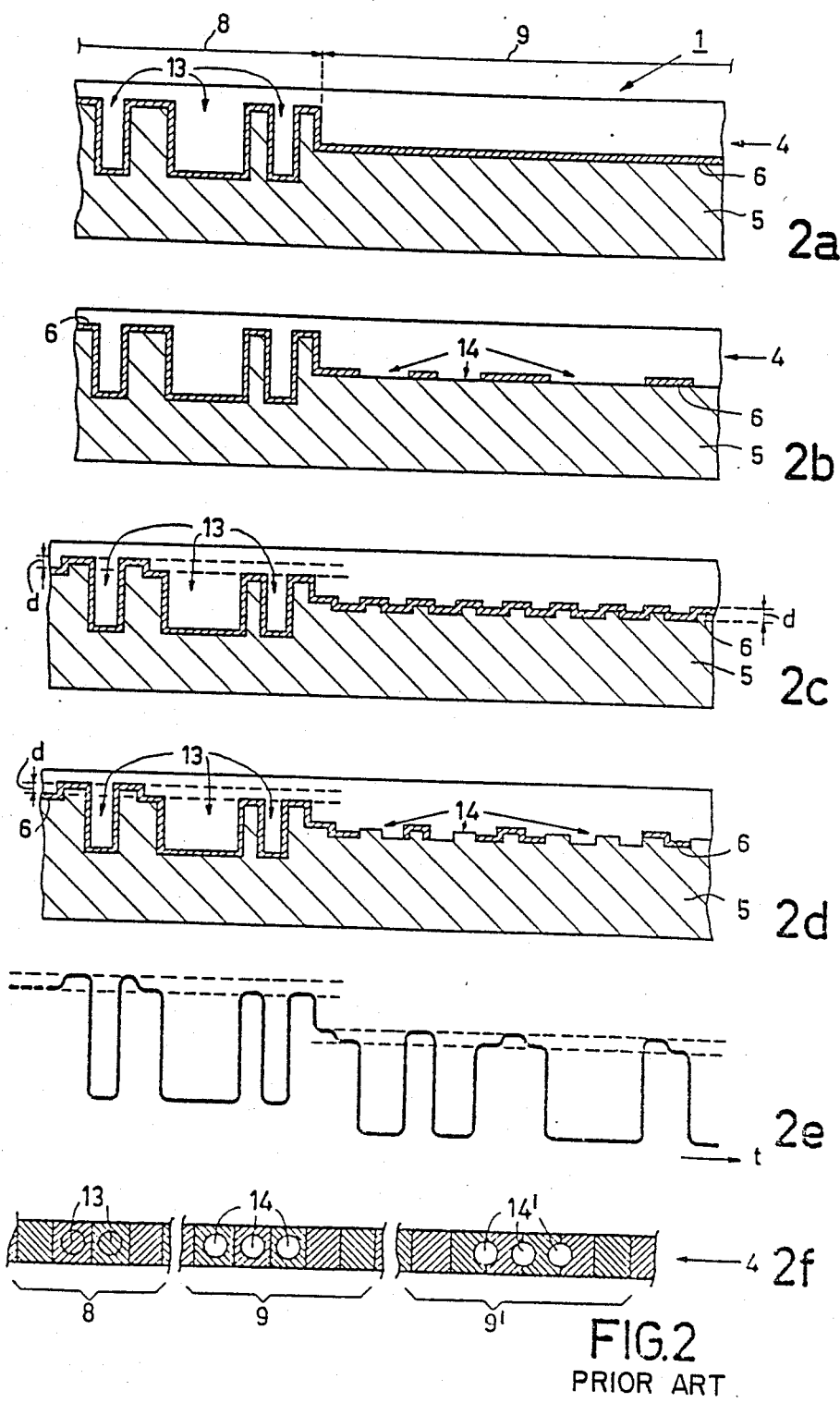

FIG. 2, in 2a to 2d, schematically represents a sectional view of a part of such a servo track 4 in the longitudinal direction of said servo tracks 4 with a part of the synchronization area 8 and a part of the information area 9, 2a showing such a sectional view of an unrecorded pre-manufactured disk using a known technique, 2b showing such a sectional view after digital information 14 has been recorded in the information area 9, 2c showing such a sectional view of an unrecorded pre-manufactured disk provided with clock information in accordance with said previous Application, and 2d representing the sectional view of 2c after information 14 has been recorded in the information area 9. 2e schematically represents the signal obtained when reading the part of the track 4 shown in sectional view in 2d, and 2f is a schematic plan view of a part of the track 4 after information has been recorded in a manner other than represented in 2b and 2d.

The servo-groove 4 is formed in a substrate 5 of the pre-manufactured disk, for example by means of a laser beam. By modulating the laser-beam intensity it is then possible to form a relief structure of pits 13 containing information in the synchronization area 8. Subsequently, the entire disk, including for the sake of simplicity that part of the record carrier 1 outside the grooves 4, may be coated with the reflecting information layer 6. In the information area 9 of the record carrier thus premanufactured information can be recorded by forming holes 14 in the reflecting information layer 6, for example, by means of a laser beam. 2b shows such an inscribed record carrier. When recording information, that is when the holes 14 are formed and when said information is read, for example by means of a laser beam, it is important that the process of writing or reading said information is synchronized by means of a clock signal, which signal may be derived from the synchronization areas 8. In order to ensure that a suitable synchronous clock signal is continuously available during writing and reading, that is also when the information areas 9 are written or read, the servo-groove 4, as described in the said previous Application, is provided with a structure which modulates the light reflected by the information carrier when the servo-track 4 is followed during writing or reading.

However, said structure should be such that it does not disturb the information-reading process. That this is possible is illustrated by means of FIG. 3, which represents the random power spectra of three possible binary information signal modulations as described in said previous Application.

The reference a designates a modulation known as "biphase" modulation, the reference b designates a modulation known as "Miller modulation" and the reference c designates a modulation known as "quadphase-modulation".

Figure 3:
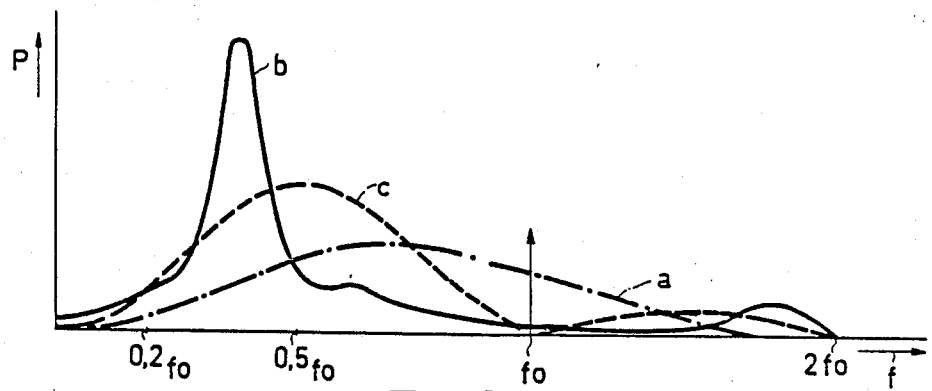
FIG. 3 represents the random power spectra of three possible binary information-signal modulations.

It is evident from FIG. 3 that a common property of these modulation techniques is that the resulting binary signal has no strong frequency components at comparatively low frequencies, for example, frequencies lower than 0.2 fo. FIG. 3 further shows that zero points occur in the spectrum at the frequency 2 fo and, when modulation method c is used, also at the frequency fo. Thus, the record carrier may be provided with a clock structure having the frequency 2 fo without said clock frequency interfering with the information signal. Zero points at the frequency 2 fo also occur when other modulation methods are used. When quadphase modulation (modulation c) is used and also when some other modulation methods are used—such as the modulation method described in the non pre-published Application No. 8,006,165, now U.S. Pat. No. 4,464,714 corresponding to U.S. application Ser. No. 315,793, filed Oct. 28, 1981, now U.S. Pat. No. 4,375,749—the frequency fo may be used for this purpose, which frequency corresponds to the bit frequency 1/T, making it very attractive to use this quadphase modulation. For modulation method b it is also possible to use a structure of the frequency fo in some cases, because the components of the spectrum of modulation b at this frequency are comparatively small. Furthermore, it is theoretically possible to give the structure a modulation corresponding to a frequency higher than 2 fo, but in most cases this poses practical problems. Indeed, in view of a maximum information density the dimensions of the pits 13 and 14, which for a specific speed of rotation of the disk 1 at least correspond to a bit time ½T, will be selected to be as close as possible to the resolving power of the write/read system used, so that a surface structure corresponding to frequencies higher than 2 fo cannot be detected in a satisfactory manner. By means of special modulation techniques, it is alternatively possible to obtain zero points in the power spectra at frequencies other than fo or 2 fo, for example at ½fo.

2c shows a sectional view, corresponding to the sectional view of 2a, of a record carrier whose surface is provided with a relief structure of a height d at least at the location of the track 4. This may be achieved by modulating the laser by means of which the synchronization area 8 and the groove 4 of the information area 9 are formed. In the present example, this is effected only between the pits 13 in the synchronization area 8 by limiting the laser beam intensity. However, in principle it is also possible to provide the bottoms of the pits with a relief structure. As is shown in 2d, it is also possible to record information on the disk in accordance with the previous Application by forming holes 14 in the reflecting layer 6 covering the relief structure. 2e shows an example of a signal obtained when reading a relief structure in accordance with 2d. This signal exhibits minima at the location of the pits 13 or holes 14 and an amplitude modulation corresponding to the modulation structure (d in 2c) with the frequency fo at the maxima. The modulation-structure at the bottom of the holes 14 hardly contributes to the signal, because it hardly reflects any light as a result of the removal of the reflecting layer 6. In this respect it is to be noted that it is, for example, alternatively possible to provide a non-reflecting layer 6 on a reflecting substrate 5, which layer is locally removed. As a result of this, the modulation of the frequency fo will be read correctly at those locations 14 where the non-reflecting layer has been removed.

In 2a–2d the pits 13 and holes 14 are represented as continuous holes or pits, that is in the case of more than one bit as an elongate slot having a length corresponding to the number of consecutive bits. However, it is alternatively possible to form each bit as a separate pit or hole. This is illustrated in 2f, which shows a track 4 in which the clock modulation structure is represented by differently hatched portions. In the synchronization area 8 in the pits 13 may then for example be located at the centres of the maxima or minima of the structure and they also are covered by the reflecting layer 6, which is symbolically represented by the hatching which extends through said pits 13. In the information portion 8 the information holes 14 may be formed in the reflecting layer 6 at the maxima and minima of the clock information structure. Alternatively it is possible—as shown by the information area 9 in 2f—to form holes 14 at the zero points of the information structure. The location of the pits 13 or holes 14 is irrelevant in this respect, provided that phase relationship with the clock information structure is fixed and known. Moreover, the shape of the information structure is of little significance. For example, instead of the castellated shape shown in FIG. 2, it may have a sinusoidal shape, which is very well possible if it is formed by means of a modulated laser beam. It is merely of importance that said clock synchronization structure exhibits a readily detectable frequency component at the frequency fo or 2 fo and does not exhibit strong components within the spectrum of the synchronization or digital information signal recorded or to be recorded, which is generally the case if the clock information structure d has a fundamental frequency fo or 2 fo with higher-order harmonics only, the next harmonic then being 2 fo or 4 fo, which as is shown in FIG. 3 falls beyond the part of the information spectrum which is of significance.

Figure 4A:
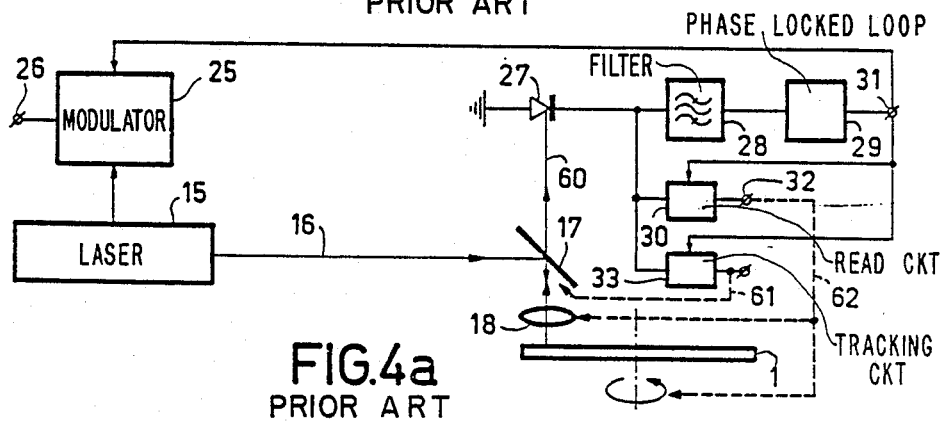
FIG. 4a shows an apparatus for recording information on such a record carrier.

In order to illustrate how the structures in accordance with FIG. 2 can be obtained, FIG. 4 schematically represents an apparatus for inscribing information in the record carrier of 2c and FIG. 4a an apparatus for reading such inscribed record carrier.

FIG. 4a schematically represents an apparatus for providing the pre-manufactured disk 6 with information while simultaneously reading the clock modulation structure. Said apparatus comprises rotating disk 1 and a laser 15, whose beam is projected onto the disk 1 via a semi-transparent mirror 17 and an optical focussing system 18. A reflected beam 60 is detected by means of a cell 27, for example a photo-diode, and is converted into an electric signal, from which the component of the frequency fo (or 2 fo), which is mainly produced by the clock modulation structure in track 4, is extracted by means of the band-pass filter 28. This signal may also be applied to a phase-locked loop 29, which improves the filter action, which increases the constancy of the clock signal, and which can compensate for brief signal drop-outs. The clock signal is then available on output 31. Data information can be recorded by pulsed modulation of the laser beam 16, either directly or by arranging a modulator in the beam or, as is represented in FIG. 4a, by modulating the laser 15 itself by means of a write modulator circuit 25, whose information is applied via input 26 and which is synchronized by the clock signal on output 31.

Via the light-sensitive element 27 and a read circuit 30, the information present in the synchronization portions is derived from the reflected beam 60, which information appears on an output 32. Said read circuit 30 can also be synchronized by the clock signal on output 31. Said information may be used for synchronizing the circuit 25 and for locating the correct position of the disk. Said information is also employed for controlling a servocontrol system, not shown in FIG. 4a, for controlling the radial position of the optical system 18 and the mirror 17 for inscribing the desired part of a track 4, and for controlling the drive of the disk 1, which is symbolically represented by the broken line 62 in FIG. 4a.

Furthermore, the apparatus is equipped with a tracking circuit 33, which derives a tracking signal from the signal supplied by the detector 27, in order to keep the beam 16 aimed at the track 4 by controlling the angle of the mirror 17 relative to the beam 16, which is symbolically represented by the line 61 in FIG. 4a.

Figure 4B:
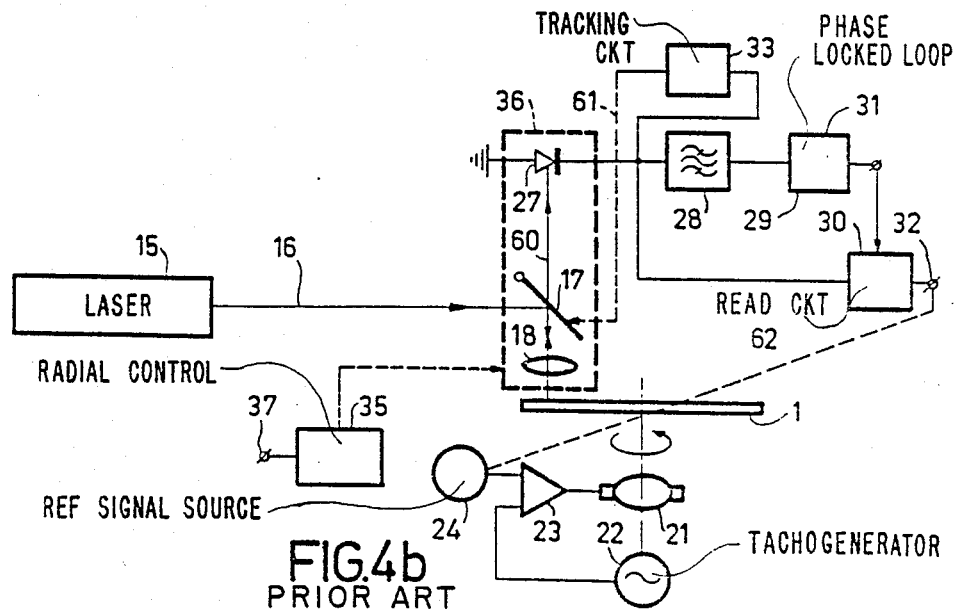
FIG. 4b shows an apparatus for reading such a record carrier.

FIG. 4b shows an apparatus for reading an inscribed disk 1, which apparatus in practice is generally combined with that of FIG. 4a. The apparatus again comprises a laser 15 whose beam is projected onto the disk 1 via the mirror 17 and the optical system 18. By means of a photo-diode 27 the reflected beam 60 is detected and the resulting electric signal is passed through a bandpass filter 28 with a pass frequency fo and a phase-locked loop 29 tuned to the frequency fo, so that the clock-signal of the frequency fo (or 2 fo) is available on output 31. The information recorded in the disk is decoded from the electrical signal supplied by the photo-diode 17 by means of the read circuit 30, so that the digital information and the information contained in the synchronization areas 8 is available on an output 32 of said circuit. Said read circuit is synchronized by the clock signal on output 31. In addition, a tracking signal can be derived from the beam detected by the photo-diode 27 by means of a tracking circuit 33, for controlling the mirror 17 in such a way that the beam 16 exactly follows the track 4. The disk drive motor 21 may be included in a speed servo-control system comprising, for example, a tacho-generator 22, a reference source 24, and a servo-amplifier 23, which control system may be coupled to the read circuit 30. Furthermore, the apparatus comprises a control mechanism 35 for radially moving the optical system 18 together with the mirror 17 and the detector 27-which assembly is designated 36 in FIG. 4b, so that at option a specific part of the disk can be read under control of information applied to an input 37 of the control mechanism 35 and the information derived from the synchronization areas by the read circuit 30 and available on output 32.

A tracking signal can be obtained by giving the track 4 a radial wobble undulation with an angular frequency $w_w$ at the nominal speed of the disk, so that the signal supplied by said detector 27 contains components of the angular frequency $w_w$ and of the angular frequency $\Delta w = w_c - w_w$, which is the difference between the angular frequency $w_c$ of the signal corresponding to the clock-synchronization structure and the angular frequency $w_w$ of the signal corresponding to the radial wobble, which components exhibit an amplitude which is a function of the distance from the centre line of the track 4. In accordance with said previous Patent Application No. 8,000,121 it is thus possible to derive a tracking signal by synchronous detection with a signal of an angular frequency $w_w$ or $\Delta w$, which signals are derived from the signal detected by the photo-diode 27, the detector 27 being divided into two halves along a dividing line which extends in the track direction and the signal of the angular frequency $w_w$ or $\Delta w$ being derived from the difference between the signals supplied by the two halves. However, it is found that this method is satisfactory only when the track is followed correctly. In the case of excursions to other tracks, for example, when a specific track is located, this method is found to fail, because during a track change, phase jumps occur in said signals of the angular frequency $w_w$ or $\Delta w$, which phase jumps have a magnitude of substantially 180°.

Figure 5:
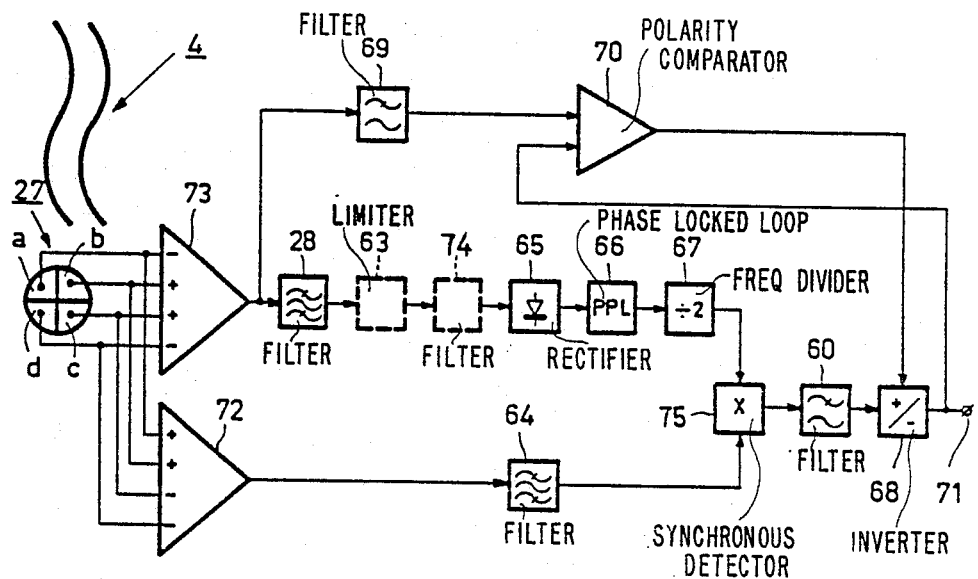
FIG. 5 shows an example of a tracking circuit for use in an apparatus in accordance with the invention.

FIG. 5 shows an example of a tracking circuit (33 in FIGS. 4a and 4b) for use in an apparatus in accordance with the invention. The photo-diode 27 is divided into four quadrants a, b, c and d along a dividing line which extends in the track direction and a dividing line which extends transversely of the track direction. By means of an amplifier 73 the difference between the amounts of light reflected by the disk and received by the quadrants (b+c) and (a+d) situated on both sides of the tangential dividing line is determined and by means of amplifier 72 the difference between the amounts of light received by the quadrants (a+b) and (c+d) disposed on both sides of the dividing line which is transverse to the direction of the track 4 is determined. The output signal of the amplifier 73 is filtered by a band-pass filter 28, which is tuned to the angular frequency $w_w$ of the radial wobble of the track 4 and, as the case may be, amplitude-limited by means of a limiter 63 and a filter 74. Said signal of the angular frequency $w_w$ is subsequently rectified by a rectifier 65, so that a component of the angular frequency $2w_w$ is obtained. This component is insensitive to said 180° phase jumps occurring during a track change. A phase-locked loop 66 is locked to said component of the angular frequency $2w_w$. The output signal of said phase-locked loop 66 is frequency-divided by the frequency divider 67, yielding a signal of the angular frequency $w_w$ which is not influenced by said phase jumps. Said signal is employed for the synchronous detection of the output signal of the amplifier 72, which is applied to a synchronous detector 75 via filter 64. Said synchronous detector 75, after filtration with the filter 60, produces a radial tracking signal on an output 71. As a result of the passage through the rectifier 65, the phase-locked loop 66 and divide-by-two divider 67 and the sign of the output signal at the output 71 is not reliable. Indeed, the output signal of the divide-by-two divider 67 may be 180° phase-shifted relative to the actual wobble signal. In order to detect this, the d.c. component of the output signal of amplifier 73 is filtered out by means of the low-pass filter 69, which d.c. component has a polarity corresponding to the radial deviation of the detector 27 from the track 4. The polarity of the output signal of the low-pass filter 69 is compared with that of the tracking signal on output 71 by means of a polarity comparator 70, which when a polarity difference is detected inverts the polarity of the tracking signal on output 71 by means of a controllable inverter 68. Another possibility is to invert the phase of the divide-by-two divider 67 under control of the comparator 70. Instead of the output signal of amplifier 72, the tangential difference signal, it is possible to apply the sum of the signals produced by the four quadrants of the detector 27 to the synchronous detector 75 via the filter 64. However, in this case the phase of the output signal of the divide-by-two divider 67 should be shifted through 90° relative to the output signal of filter 64.

Instead of the rectifier 65 other circuits supplying a signal component of double frequency—such as a squaring circuit—may be employed. It is also possible to employ higher even harmonics.

A requirement for the correct operation of the circuit described during a track change is that the tracks, with respect to the phase of the radial wobble, are radially disposed in line.

In order to ensure the correct polarity of the output signal on output 71 several possibilities are available. For example, the radial wobble may be recorded in synchronism with the information in the synchronization areas 8 (FIG. 1b), by means of which information the phase of the divide-by-two divider 67 can be checked. Another method of checking the polarity of the output signal on the output 71 is to have the detector 27 travel transversely of the tracks in one specific radial direction, using the fact that the clock signal obtained (FIG. 4b) is a maximum when the detector 27 is located on a track, or the fact that the d.c. component of the sum signal produced by the four quadrants is a minimum when the detector 27 is located on a track, by comparing the polarity of the actual deviation with the polarity of the output signal on output 71.

The invention is not limited to the use in combination with a pre-recorded clock signal, although the method of radial wobble in conjunction with a pre-recorded clock signal, as described in said previous Application is very advantageous because a faster track change can be achieved when using a high-frequency radial wobble. Indeed, the apparatus will only function without problems when the track-change frequency is substantially lower than the frequency of the radial wobble. Furthermore, if the frequency radial wobble is equal to the bit frequency (fo in FIG. 3), the reference signal obtained by means of the divide-by-two divider may be employed as clock signal for the data processing without the use of a second track modulation (as described in said previous Application).

What is claimed is:

1. An apparatus for recording and/or reading information on a record carrier comprising a disk-shaped substrate provided with a radiation sensitive information layer and a plurality of generally circular tracks arranged in a spiral or concentric track pattern, said tracks having a periodic radial track modulation having a predetermined period and being radially in phase from track to track for generating a radial tracking signal during recording or reading of the information, said apparatus comprising means for projecting a beam of radiation onto said record carrier, means for producing relative movement between said beam and said record carrier so that said beam scans a given track and the radiation of said beam is modulated by said track modulation with a frequency corresponding to said predetermined period, means for generating said tracking signal and means responsive to said tracking signal for maintaining said beam centered on said track being scanned, said tracking signal generating means including at least two radiation-sensitive detectors arranged on opposite sides of a line corresponding to the track direction and disposed in the path of said modulated radiation coming from the record carrier, each of said two detectors supplying an output signal in dependence on the modulated radiation incident thereon, means coupled to said two detectors for producing a difference signal representative of the difference between said output signals, said difference signal having a frequency corresponding to said predetermined period, means responsive to said modulated radiation for deriving therefrom a further signal having a frequency corresponding to said predetermined period, means for generating a higher, even harmonic of one of said difference and further signals, means for deriving from said higher harmonic a reference signal having a frequency corresponding to said predetermined period, and means for producing said tracking signal by synchronous detection of said reference signal and the other of said difference and further signals.

2. An apparatus as claimed in claim 1 wherein said higher harmonic generated by said generating means is a higher harmonic of said difference signal and said tracking signal is produced by synchronous detection of said reference signal derived from said higher harmonic of said difference signal and said further signal.

3. An apparatus as claimed in claim 1 or 2, wherein the means for generating said higher harmonic comprises a rectifying circuit and that the means for producing the reference signal comprises a divide-by-two frequency divider.

4. An apparatus as claimed in claim 1 or 2, including means for comparing the polarity of a d.c. component of said difference signal with the polarity of the radial tracking signal and means for correcting the polarity of said radial tracking signal when said polarities differ.

5. An apparatus as claimed in claim 4, wherein the means for correcting the polarity of the radial tracking signal comprises a switchable inverter.

* * * * *